United States Patent
Wang et al.

(10) Patent No.: US 12,002,254 B2
(45) Date of Patent: Jun. 4, 2024

(54) METHOD AND APPARATUS OF TRAINING OBJECT DETECTION NETWORK AND OBJECT DETECTION METHOD AND APPARATUS

(71) Applicant: BOE Technology Group Co., Ltd., Beijing (CN)

(72) Inventors: Jingru Wang, Beijing (CN); Fengshuo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 432 days.

(21) Appl. No.: 17/613,442

(22) PCT Filed: Feb. 26, 2021

(86) PCT No.: PCT/CN2021/078156
§ 371 (c)(1),
(2) Date: Nov. 22, 2021

(87) PCT Pub. No.: WO2022/178833
PCT Pub. Date: Sep. 1, 2022

(65) Prior Publication Data
US 2022/0277541 A1    Sep. 1, 2022

(51) Int. Cl.
*G06V 10/56* (2022.01)
*G06T 7/90* (2017.01)
(Continued)

(52) U.S. Cl.
CPC ............... *G06V 10/56* (2022.01); *G06T 7/90* (2017.01); *G06V 10/774* (2022.01); *G06V 10/82* (2022.01)

(58) Field of Classification Search
CPC ... G06F 18/211; G06F 18/231; G06V 10/771; G06V 40/161; G06V 10/768
See application file for complete search history.

(56) References Cited

U.S. PATENT DOCUMENTS 6,355,336 B1 * 3/2002 Wakabayashi .......... B32B 27/32
428/483
9,805,296 B2 * 10/2017 Loy .................. G06K 19/06037
(Continued)

FOREIGN PATENT DOCUMENTS

CN     101115211 A     1/2008
CN     103593834 A     2/2014
(Continued)

OTHER PUBLICATIONS

S. Qi et al., "Multi-Task FaceBoxes: A Lightweight Face Detector Based on Channel Attention and Context Information", KSII Transactions on Internet and Information Systems, vol. 14, No. 10, Oct. 2020.
(Continued)

*Primary Examiner* — Yosef Kassa
(74) *Attorney, Agent, or Firm* — Intellectual Valley Law, P.C.

(57) ABSTRACT

A method of training an object detection network, an object detection method and related apparatuses are provided. The training method includes: inputting a training image into a to-be-trained object detection network to obtain detection information of a target object, where the detection information includes a detection class of the target object, a detection position of a detection box of the target object, and a detection position of a landmark of the target object; calculating a total loss function of the to-be-trained object detection network, where the total loss function is calculated according to a loss function of the detection class of the target object, a loss function of the detection position of the detection box of the target object, and a loss function of the detection position of the landmark of the target object; and adjusting a parameter of the to-be-trained object detection network according to the total loss function.

20 Claims, 6 Drawing Sheets

(51) Int. Cl.
*G06V 10/774* (2022.01)
*G06V 10/82* (2022.01)

(56) References Cited

U.S. PATENT DOCUMENTS

| | | | | |
|---|---|---|---|---|
| 10,223,344 | B2* | 3/2019 | Dakin | G06F 40/274 |
| 2014/0143889 | A1* | 5/2014 | Ginter | G06F 21/87 |
| | | | | 726/27 |
| 2017/0372153 | A1 | 12/2017 | Justice et al. | |
| 2021/0110158 | A1* | 4/2021 | Lee | G06N 20/00 |

FOREIGN PATENT DOCUMENTS

| | | |
|---|---|---|
| CN | 109978918 A | 7/2019 |
| CN | 110503097 A | 11/2019 |
| CN | 111161277 A | 5/2020 |
| CN | 111199230 A | 5/2020 |
| CN | 111508002 A | 8/2020 |
| CN | 111709295 A | 9/2020 |
| CN | 111738077 A | 10/2020 |
| CN | 111898406 A | 11/2020 |
| CN | 112183435 A | 1/2021 |
| CN | 112288726 A | 1/2021 |

OTHER PUBLICATIONS

Qiu Suo, "Smart TV Control System using Gesture Recognition Based on Single-Camera", A Dissertation Submitted for the Degree of Master, South China University of Technology, section 2.2.3 Color Space, pp. 19-20, English Translation attached.

L. Mao, "Adaptive Gesture Recognition Algorithm Based on Motion History Image", Journal of Hangzhou Dianzi University (Natural Sciences), vol. 37, No. 5, Sep. 2017, English Translation attached.

* cited by examiner

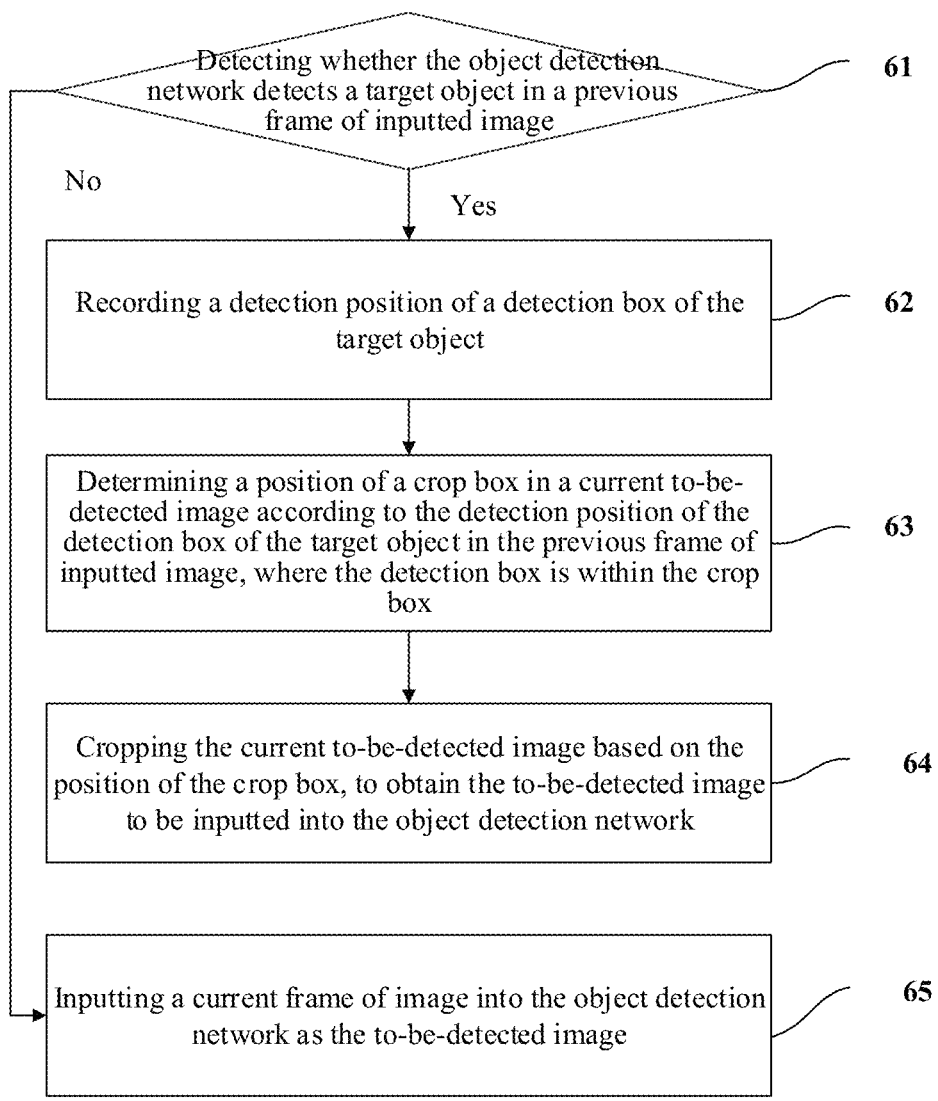

METHOD AND APPARATUS OF TRAINING OBJECT DETECTION NETWORK AND OBJECT DETECTION METHOD AND APPARATUS

CROSS-REFERENCE TO RELATED APPLICATION

The present application is a U.S. national phase application of a PCT Application No. PCT/CN2021/078156 filed on Feb. 26, 2021, a disclosure of which is incorporated herein by reference in its entirety.

TECHNICAL FIELD

Embodiments of the present disclosure relate to the field of image processing technologies, and in particular, to a method and an apparatus of training an object detection network and an object detection method and apparatus.

BACKGROUND

With the development of computer technologies, the research on detection and real-time tracking of an object by using computer image processing technologies becomes increasingly popular. Because of complex and varied application scenarios, there is a relatively high requirement for the robustness of an object detection network.

SUMMARY

The present disclosure provides in some embodiments a method and an apparatus of training an object detection network and an object detection method and apparatus, to resolve a problem in the related art that the robustness of an object detection network is relatively poor.

To resolve the foregoing technical problem, the present disclosure is implemented in the following manner:

In a first aspect, an embodiment of the present disclosure provides a method of training an object detection network, including:

inputting a training image into a to-be-trained object detection network to obtain detection information of a target object in the training image, where the detection information includes a detection class of the target object, a detection position of a detection box of the target object, and a detection position of a landmark of the target object inside the detection box;

calculating a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box; and adjusting a parameter of the to-be-trained object detection network according to the total loss function of the to-be-trained object detection network, to obtain a trained object detection network.

Optionally, the inputting the training image into the to-be-trained object detection network to obtain the detection information of the target object in the training image includes:

inputting the training image into a first convolutional network of the to-be-trained object detection network, to obtain feature maps of a plurality of scales; and individually inputting the feature maps of the scales into a second convolutional network of the to-be-trained object detection network, to obtain detection information at each pixel position in each of the feature maps, where the to-be-trained object detection network includes the first convolutional network and the second convolutional network.

Optionally, the second convolutional network includes a first convolutional layer with a convolution kernel size of 1*1*n, where the first convolutional layer is configured to convert the feature map into a first target feature map including the detection position of the landmark of the target object inside the detection box, and n is any positive integer.

Optionally, the total loss function is calculated by using the following formula:

$$L = L_{cis} + \alpha_1 L_{box} + \alpha_2 L_{ldm},$$

where L is the total loss function, $L_{cis}$ is the first loss function, $L_{box}$ is the second loss function, $L_{ldm}$ is the third loss function, and $\alpha_1$ and $\alpha_2$ are weights.

Optionally, the first loss function is calculated by using the following formula:

$$L_{cls} = -\sum_{i \in Pos}^{N} x_{ij} \log(c_i^p) - \sum_{i \in Neg} \log(c_i^0)$$

where i represents an $i^{th}$ candidate box, j represents a $j^{th}$ true box, p represents a $p^{th}$ class, $x_{ij}$ represents whether the $i^{th}$ candidate box matches the $j^{th}$ true box, $c_i^p$ represents a probability that the $i^{th}$ candidate box is determined as the $p^{th}$ class, $c_i^0$ represents a probability that the $i^{th}$ candidate box is determined as a background class, Pos represents a set of candidate boxes that match the $j^{th}$ true box, and Neg represents the set of candidate boxes that do not match the $j^{th}$ true box.

Optionally, the second loss function is calculated by using the following formula:

$$L_{box} = \sum_{i \in Pos}^{N} x_{ij} smooth_{L1}(l_{bi} - g_{bj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{bi}$ represents a detection position of a detection box corresponding to the $i^{th}$ candidate box, and $g_{bj}$ is the position of the $j^{th}$ true box.

Optionally, the third loss function is calculated by using the following formula:

$$L_{ldm} = \sum_{i \in Pos}^{N} x_{ij} smooth_{L1}(l_{li} - g_{lj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{li}$ represents a detection position of a landmark of a target object inside a detection box corresponding to the $i^{th}$ candidate box, and $g_{lj}$ is a true position of a landmark of a target object in the $j^{th}$ true box.

Optionally, the detection position of the detection box includes: an offset amount of the horizontal coordinate of the center point of the detection box relative to the horizontal coordinate of the center point of a candidate box, an offset amount of the vertical coordinate of the center point of the detection box relative to the vertical coordinate of the center point of the candidate box, an offset amount of the length of the detection box relative to the length of the candidate box, and an offset amount of the width of the detection box relative to the width of the candidate box; and the detection position of the landmark of the target object inside the detection box includes a predicted horizontal coordinate of the landmark of the target object and a predicted vertical coordinate of the landmark of the target object.

Optionally, before the inputting the training image into the to-be-trained object detection network to obtain the detection information of the target object in the training image, the method further includes:

randomly generating, for each to-be-enhanced training image, a color mask with a size the same as a size of the to-be-enhanced training image, where the color mask includes only one color; and fusing the to-be-enhanced training image and the color mask, to obtain a color-enhanced training image as the training image inputted into the to-be-trained object detection network.

Optionally, the to-be-enhanced training image and the color mask are fused by using the following formula:

$$img_{aug} = \alpha * color_{mask} + (1-\alpha) * img,$$

where $color_{mask}$ represents the generated color mask, img represents the to-be-enhanced training image, $\alpha$ represents a weight, $img_{aug}$ represents the color-enhanced training image, and $0 < \alpha < 0.5$.

Optionally, before the inputting the training image into the to-be-trained object detection network to obtain the detection information of the target object in the training image, the method further includes:

converting, for each to-be-enhanced training image, the to-be-enhanced training image from an RGB color space into an HSV color space;

randomly transforming an H channel of the to-be-enhanced training image converted into the HSV color space, to obtain a transformed to-be-enhanced training image; and converting the transformed to-be-enhanced training image back into the RGB color space, to obtain a color-enhanced training image as the training image inputted into the to-be-trained object detection network.

Optionally, the target object is a hand, and the landmark is a point representing a joint position of the target object.

In a second aspect, an embodiment of the present disclosure provides an object detection method, including:

inputting a to-be-detected image into an object detection network, and outputting a detection position and a detection class of a detection box of a target object in the to-be-detected image, where the object detection network is trained by using the method of training an object detection network described in the first aspect.

Optionally, the inputting the to-be-detected image into the object detection network, and outputting the detection position and the detection class of the detection box of the target object in the to-be-detected image includes:

inputting the to-be-detected image into the object detection network, to obtain detection information of the target object in the to-be-detected image, where the detection information includes the detection class of the target object, the detection position of the detection box of the target object, and a detection position of a landmark of the target object inside the detection box; and outputting the detection position and the detection class of the detection box of the target object in the to-be-detected image based on the detection position of the landmark of the target object inside the detection box.

Optionally, before the inputting the to-be-detected image into the object detection network, the method further includes: obtaining a current to-be-detected image; and the inputting the to-be-detected image into the object detection network, to obtain the detection position of the detection box of the target object in the to-be-detected image includes:

recording the detection position of the detection box of the target object if the object detection network detects the target object in a previous frame of inputted image;

determining a position of a crop box in the current to-be-detected image according to the detection position of the detection box of the target object in the previous frame of inputted image, where the detection box is within the crop box; and cropping the current to-be-detected image based on the position of the crop box, to obtain the to-be-detected image to be inputted into the object detection network.

Optionally, coordinates of a center point of the crop box are the same as coordinates of a center point of the detection box, the length of the crop box is n times the length of the long side of the detection box, and the width of the crop box is m times the length of the long side of the detection box.

Optionally, an aspect ratio of the to-be-detected image is n:m.

Optionally, the method further includes:

inputting the current to-be-detected image into the object detection network as the to-be-detected image if the object detection network fails to detect the target object in the previous frame of inputted image.

In a third aspect, an embodiment of the present disclosure provides an apparatus of training an object detection network, including:

a prediction module, configured to input a training image into a to-be-trained object detection network to obtain detection information of a target object in the training image, where the detection information includes a detection class of the target object, a detection position of a detection box of the target object, and a detection position of a landmark of the target object inside the detection box;

a calculation module, configured to calculate a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box; and an adjustment module, configured to adjust a parameter of the to-be-trained object detection network according to the total loss function of the to-be-trained object detection network, to obtain a trained object detection network.

In a fourth aspect, an embodiment of the present disclosure provides an object detection apparatus, including:

a prediction module, configured to: input a to-be-detected image into an object detection network, and output a detection position and a detection class of a detection box of a target object in the to-be-detected image, where the object detection network is trained by using the method of training an object detection network described in the first aspect.

In a fifth aspect, an embodiment of the present disclosure provides an electronic device, including a processor, a storage, and a program or instruction stored in the storage and configured to be executed by the processor, where the processor is configured to execute the program or instruction to implement the steps of the method of training an object detection network according to the first aspect, or, to implement the steps in the object detection method according to the second aspect.

In a sixth aspect, an embodiment of the present disclosure provides a readable storage medium, where the readable storage medium stores a program or instruction therein, and the program or instruction is configured to be executed by a processor to implement the steps in the method of training an object detection network according to the first aspect, or, to implement the steps in the object detection method according to the second aspect.

In the embodiments of the present disclosure, during the training of an object detection network, in addition to a detection class loss of a detection box and a detection position loss of the detection box of a target object in a training image, a detection position loss of a landmark of the target object is further considered, thereby helping to improve the quality of the detected target object, reduce the impact of an interfering object on a detection result in complex application scenarios, and increase the robustness of the object detection network.

BRIEF DESCRIPTION OF THE DRAWINGS

Various other advantages and benefits will become more obvious to persons of ordinary skill in the art having read detailed description of the following optional implementations. The accompanying drawings are only used for describing the optional implementations, and should not be considered as a limitation on the present disclosure. The same reference numerals represent the same components throughout the accompanying drawings. In the accompanying drawings:

FIG. 5 is a schematic flowchart of an object detection method according to an embodiment of the present disclosure;

FIG. 6 is a schematic flowchart of an object detection method according to another embodiment of the present disclosure;

DETAILED DESCRIPTION

The following clearly describes the technical solutions in the embodiments of the present disclosure with reference to the accompanying drawings in the embodiments of the present disclosure. Apparently, the described embodiments are only some embodiments of the present disclosure rather than all the embodiments. All other embodiments obtained by persons of ordinary skill in the art based on the embodiments of the present disclosure without creative efforts fall within the scope of the present disclosure.

Figure 1:
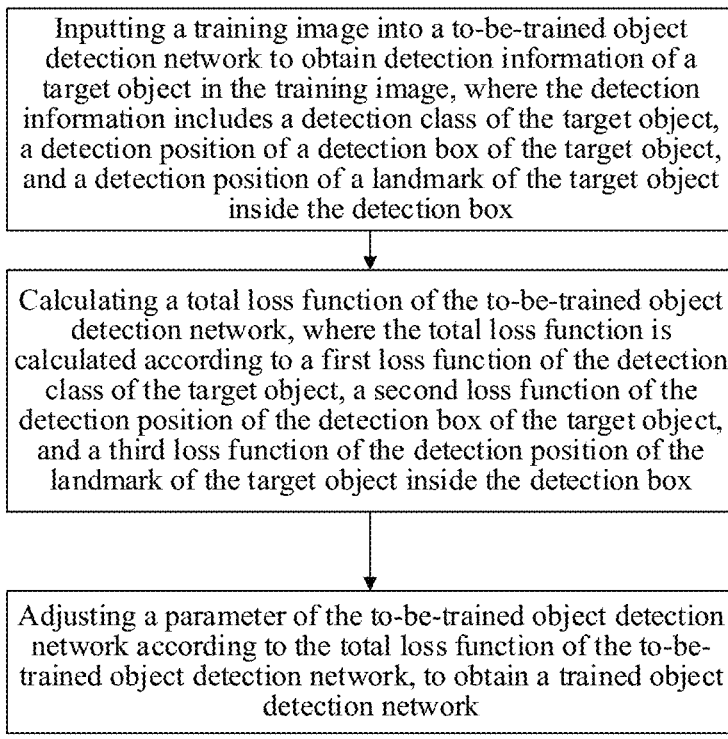
FIG. 1 is a schematic flowchart of a method of training an object detection network according to an embodiment of the present disclosure.

Referring to FIG. 1, an embodiment of the present disclosure provides a method of training an object detection network. The method includes steps 11, 12 and 13.

The step 11 includes: inputting a training image into a to-be-trained object detection network to obtain detection information of a target object in the training image, where the detection information includes a detection class of the target object, a detection position of a detection box of the target object, and a detection position of a landmark of the target object inside the detection box.

In the embodiment of the present disclosure, the object detection network is configured to detect a target object. The target object may be, for example, a hand or a human face.

In the embodiment of the present disclosure, the process in which the object detection network processes an inputted image may be as follows: processing the inputted image by using a first convolutional network, to output feature maps of a plurality of scales, processing, for the feature map of each scale, the feature map by using a second convolutional network, to output detection information of a target object at each pixel position in each feature map. The detection information includes a detection position of a detection box of the target object, a detection class of the target object, and a detection position of a landmark of the target object inside the detection box. During the processing the feature map by using the second convolutional network, a plurality of candidate boxes are predicted at each pixel position of the feature map. For each candidate box, a class of the candidate box is predicted, and the detection position of the detection box is predicted. The detection box and the candidate box have a one-to-one correspondence.

The object detection network in the embodiment of the present disclosure may be an object detection network having a single-shot multibox detector (SSD) structure. Six layers of feature maps may be selected. Certainly, another quantity of layers of feature maps may be selected.

In the embodiment of the present disclosure, the first convolutional network may be any convolutional neural network. For example, the first convolutional network of the object detection network may be obtained by deleting some convolutional layers and fully-connected layers from VGG16 or mobilenet (a depth-wise separable convolutional network) and adding several convolutional layers.

In the embodiment of the present disclosure, the object detection network may calculate a detection class of the detection box in the following manner: comparing a candidate box at each pixel position of the feature map with a true box annotated in the training image, to obtain the class of the candidate box. For example, an intersection over union of the candidate box and true box may be calculated. If the intersection over union is greater than a preset threshold, it is considered that the class of the candidate box is target object. If the intersection over union is less than the preset threshold, it is considered that the class of the candidate box is background. A class of the detection box is the same as the class of the corresponding candidate box.

The step 12 includes: calculating a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box.

In the embodiment of the present disclosure, for each feature map, the total loss function of each pixel position may be calculated.

The step 13 includes: adjusting a parameter of the to-be-trained object detection network according to the total loss function of the to-be-trained object detection network, to obtain a trained object detection network.

In the embodiment of the present disclosure, the parameter of the to-be-trained object detection network is adjusted by combining the total loss functions of all pixel positions of every feature map.

In the embodiment of the present disclosure, during the training of an object detection network, in addition to considering a detection class loss of a detection box and a detection position loss of the detection box, a detection position loss of a landmark of a target object is further considered, thereby helping to improve the quality of the detected target object, reduce the impact of an interfering object on a detection result in complex application scenarios, and increase the robustness of the object detection network. For a case that the target object to be detected has a small size or varied postures, for example, when an image captured at a long distance is used to detect a human hand gesture to perform gesture control, the human hand occupies a very small area in such an image, and it is not easy to accurately detect such a target object as the human hand. In the embodiment of the present disclosure, during the training of an object detection network, detection position information of a landmark of a target object is additionally considered, and more features of the target object can be extracted, so that a training network detects the target object more easily, and during the use of the object detection network, the accuracy of detecting the target object can be improved.

In the embodiment of the present disclosure, optionally, the detection position of the detection box includes: an offset amount of the horizontal coordinate of the center point of the detection box relative to the horizontal coordinate of the center point of a candidate box, an offset amount of the vertical coordinate of the center point of the detection box relative to the vertical coordinate of the center point of the candidate box, an offset amount of the length of the detection box relative to the length of the candidate box, and an offset amount of the width of the detection box relative to the width of the candidate box.

In the embodiment of the present disclosure, optionally, the detection position of the landmark of the target object inside the detection box includes a predicted horizontal coordinate of the landmark of the target object and a predicted vertical coordinate of the landmark of the target object.

Figure 2:
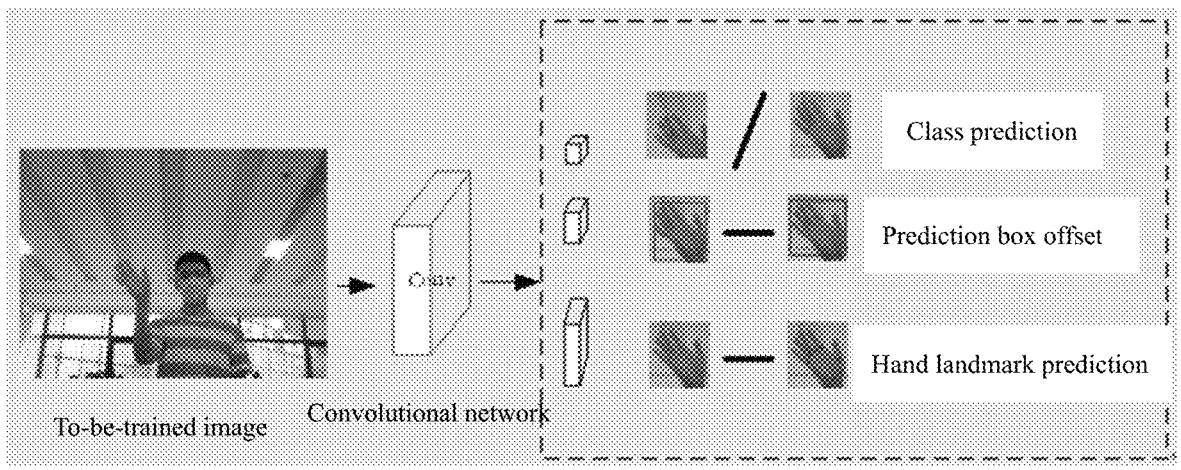
FIG. 2 is a schematic structural diagram of an object detection network according to an embodiment of the present disclosure.

In the embodiment of the present disclosure, a case in which the object detection network is a detection network for detecting a hand is taken as an example. The structure of the object detection network may be as shown in FIG. 2.

In the embodiment of the present disclosure, optionally, the second convolutional network includes a first convolutional layer with a convolution kernel size of 1*1*n, where the first convolutional layer is configured to convert the feature map into a first target feature map including the detection position of the landmark of the target object inside the detection box, and n is any positive integer.

In the embodiment of the present disclosure, for an offset of the detection box, the second convolutional network may convert the feature map into a feature map with a channel quantity of $N_i \times 4$ and a size of $W_i \times H_i$, where $N_i$ represents a quantity of candidate boxes generated at each pixel position for a feature map of an $i^{th}$ layer. For each candidate box, offset amounts of the horizontal and vertical coordinates of the center point and the length and the width of the corresponding detection box are obtained. For the prediction of the position of a landmark, the second convolutional network converts the feature maps into feature maps with a channel quantity of $N_i \times N_1 \times 2$ and a size of $W_i \times H_i$. For each candidate box, the horizontal and vertical coordinates of a quantity $N_1$ of landmarks of the corresponding detection box are obtained. A quantity of landmarks may be set as required. For example, for a case that the target object is a human hand, there may be six landmarks, which correspond to five knuckles and one palm center joint respectively.

In the embodiment of the present disclosure, optionally, the total loss function is calculated by using the following formula:

$$L = L_{cls} + \alpha_1 L_{box} + \alpha_2 L_{ldm},$$

where L is the total loss function, $L_{cls}$ is the first loss function, $L_{box}$ is the second loss function, $L_{ldm}$ is the third loss function, and $\alpha_1$ and $\alpha_2$ are weights.

$\alpha_1$ and $\alpha_2$ may be preset, or may be obtained through adjustment in the process of training the object detection network.

In the embodiment of the present disclosure, optionally, the first loss function is calculated by using the following formula:

$$L_{cls} = -\sum_{i \in Pos}^{N} x_{ij} \log(c_i^p) - \sum_{i \in Neg} \log(c_i^0)$$

where i represents an $i^{th}$ candidate box, j represents a $j^{th}$ true box, p represents a $p^{th}$ class, $x_{ij}$ represents whether the $i^{th}$ candidate box matches the $j^{th}$ true box, $c_i^p$ represents a probability that the $i^{th}$ candidate box is determined as the $p^{th}$ class, $c_i^0$ represents a probability that the $i^{th}$ candidate box is determined as a background class, Pos represents a set of candidate boxes that match the $j^{th}$ true box, and Neg represents the set of candidate boxes that do not match the $j^{th}$ true box.

In the embodiment of the present disclosure, optionally, the second loss function is calculated by using the following formula:

$$L_{box} = \sum_{i \in Pos}^{N} x_{ij} smooth_{L1}(l_{bi} - g_{bj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{bi}$ represents a detection position of a detection box corresponding to the $i^{th}$ candidate box, and $g_{bj}$ is the position of the $j^{th}$ true box.

In the embodiment of the present disclosure, optionally, the third loss function is calculated by using the following formula:

$$L_{ldm} = \sum_{i \in Pos}^{N} x_{ij} smooth_{L1}(l_{li} - g_{lj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{li}$ represents a detection position of a landmark of a target object inside a detection box corresponding to the $i^{th}$ candidate box, and $g_{lj}$ is a true position of a landmark of a target object in the $j^{th}$ true box.

In some embodiments of the present disclosure, optionally, the target object may be a hand, and the landmark is a point representing a joint position of the target object.

In some embodiments of the present disclosure, optionally, the target object may be a face. The landmark is a point representing facial features of the target object.

During the actual use of an object detection network, environmental lighting is complex and varied. For example, lamp light of a special color is usually used in an exhibition hall. As a result, a target object in an image may exhibit different colors, making a detection task exceedingly difficult.

Figure 3:
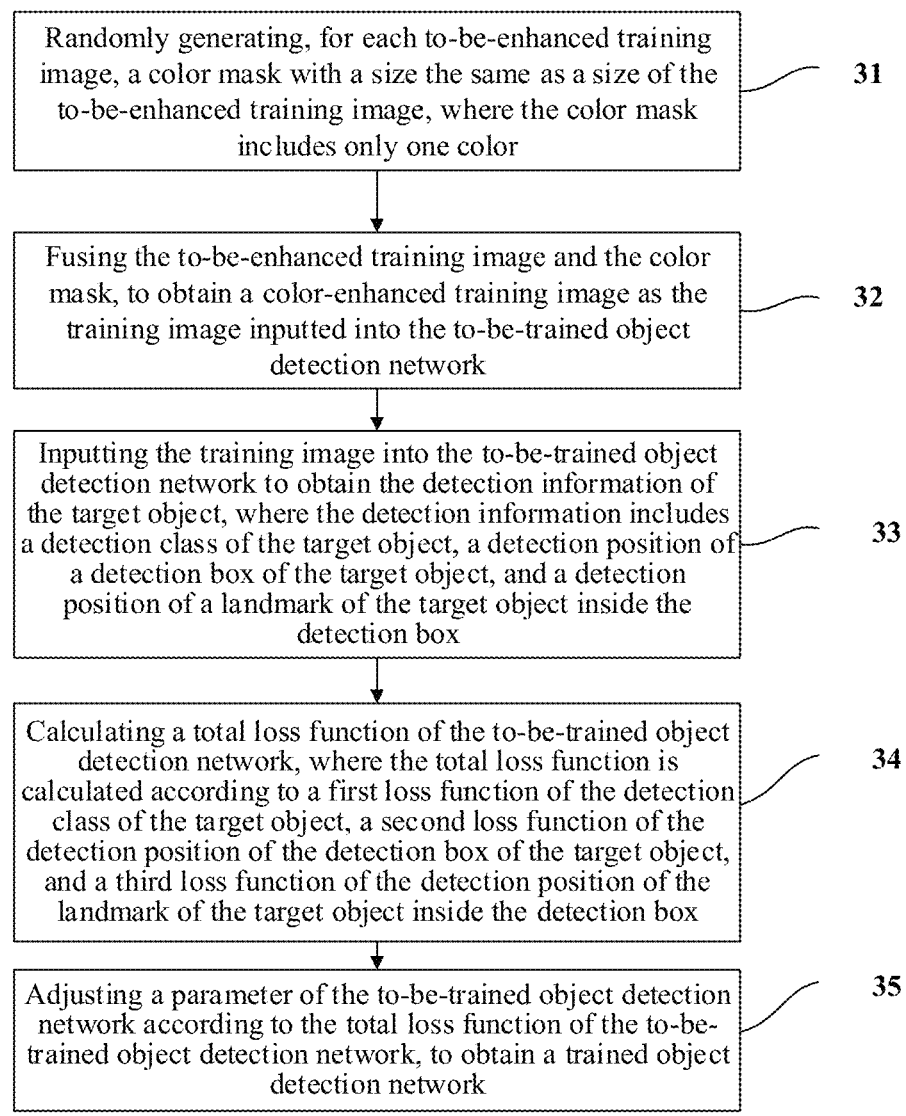
FIG. 3 is a schematic flowchart of a method of training an object detection network according to another embodiment of the present disclosure.

To resolve the foregoing problem, referring to FIG. 3, an embodiment of the present disclosure provides a method of training an object detection network. The method includes steps 31 to 35.

The step 31 includes: randomly generating, for each to-be-enhanced training image, a color mask with a size the same as a size of the to-be-enhanced training image, where the color mask includes only one color.

The step 32 includes: fusing the to-be-enhanced training image and the color mask, to obtain a color-enhanced training image as the training image inputted into the to-be-trained object detection network.

In the embodiment of the present disclosure, optionally, the to-be-enhanced training image and the color mask are fused by using the following formula:

$$img_{aug} = \alpha * color_{mask} + (1-\alpha) * img,$$

where $color_{mask}$ represents the generated color mask, img represents the to-be-enhanced training image, α represents a weight, $img_{aug}$ represents the color-enhanced training image, and 0<α<0.5.

The step 33 includes: inputting the training image into the to-be-trained object detection network to obtain the detection information of the target object, where the detection information includes a detection class of the target object, a detection position of a detection box of the target object, and a detection position of a landmark of the target object inside the detection box.

The step 34 includes: calculating a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box.

The step 35 includes: adjusting a parameter of the to-be-trained object detection network according to the total loss function of the to-be-trained object detection network, to obtain a trained object detection network.

In the embodiment of the present disclosure, the color of the training image is adjusted, so that it can be ensured that the trained object detection network is applicable to environments with different lighting conditions, thereby improving the robustness of the object detection network.

Figure 4:
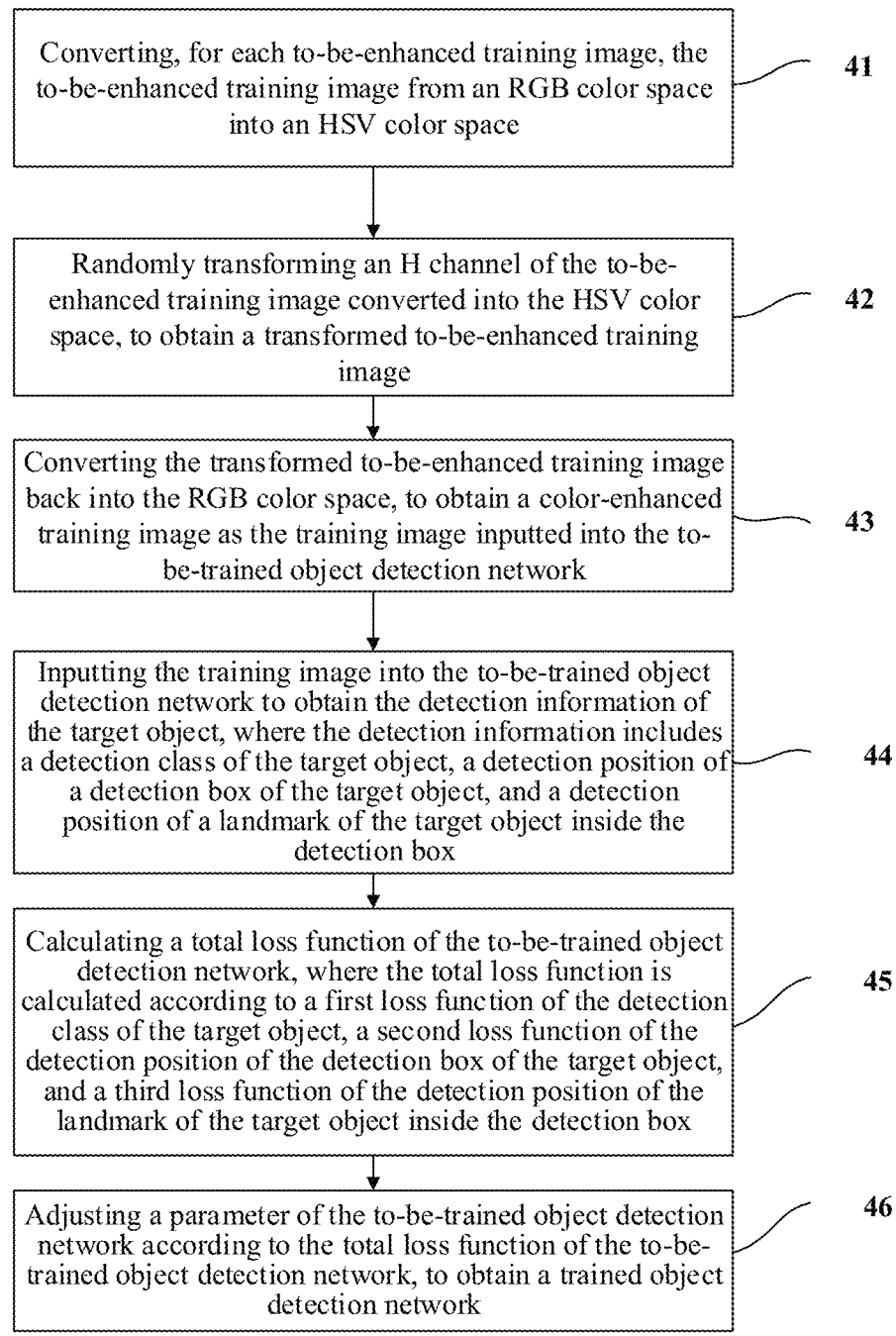
FIG. 4 is a schematic flowchart of a method of training an object detection network according to still another embodiment of the present disclosure.

In the embodiment of the present disclosure, the color of the training image may be adjusted by using another method. Referring to FIG. 4, an embodiment of the present disclosure provides a method of training an object detection network. The method includes steps 41 to 46.

The step 41 includes: converting, for each to-be-enhanced training image, the to-be-enhanced training image from an RGB color space into an HSV color space.

The step 42 includes: randomly transforming an H channel of the to-be-enhanced training image converted into the HSV color space, to obtain a transformed to-be-enhanced training image.

Optionally, the randomly transforming the H channel of the to-be-enhanced training image converted into the HSV color space includes: performing linear transformation of the H channel of the to-be-enhanced training image converted into the HSV color space.

The step 43 includes: converting the transformed to-be-enhanced training image back into the RGB color space, to obtain a color-enhanced training image as the training image inputted into the to-be-trained object detection network.

The step 44 includes: inputting the training image into the to-be-trained object detection network to obtain the detection information of the target object, where the detection information includes a detection class of the target object, a detection position of a detection box of the target object, and a detection position of a landmark of the target object inside the detection box.

The step 45 includes: calculating a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box.

The step 46 includes: adjusting a parameter of the to-be-trained object detection network according to the total loss function of the to-be-trained object detection network, to obtain a trained object detection network.

Referring to FIG. 5, an embodiment of the present disclosure further provides an object detection method. The method includes a step 51.

The step 51 includes: inputting a to-be-detected image into an object detection network, and outputting a detection position and a detection class of a detection box of a target object in the to-be-detected image, where the object detection network is trained by using the method of training an object detection network in any of the foregoing embodiments.

In some embodiments of the present disclosure, during the training of an object detection network, three types of data, namely, a detection class of a detection box of the target object, a position of the detection box, and a detection position of a landmark of the target object inside the detection box, need to be outputted, to optimize parameters of the network. During the actual use of the object detection network, it is possible to only output the position and the detection class of the detection box. That is, the detection position of the landmark of the target object inside the detection box is not used.

In some other embodiments, the detection position of the landmark of the target object inside the detection box may also be used, that is, the inputting the to-be-detected image into the object detection network, and outputting the detection position and the detection class of the detection box of the target object in the to-be-detected image includes:

inputting the to-be-detected image into the object detection network, to obtain detection information of the target object in the to-be-detected image, where the detection information includes the detection class of the target object, the detection position of the detection box of the target object, and a detection position of a landmark of the target object inside the detection box; and outputting the detection position and the detection class of the detection box of the target object in the to-be-detected image based on the detection position of the landmark of the target object inside the detection box. For example, if no landmark is detected inside the detection box, or, although a landmark is detected, an analysis result indicates that the landmark is not a landmark of the target object, it may be determined that the detection box does not belong to the target object.

In a scenario of long-distance object detection, the difficulty of detecting some target objects is greatly increased. For example, in a use scenario of simulating a mouse with a hand, a first gesture needs to be detected to trigger a "click operation". If long-distance detection is performed, the area of a human hand in the first state is significantly less than the area of the human hand in the palm state, and a decrease in the area of the to-be-detected object makes a detection task more difficult. To resolve the foregoing problem, referring to FIG. 6, an embodiment of the present disclosure further provides an object detection method. The method includes steps 61 to 65.

The step 61 includes: detecting, for each to-be-detected image to be inputted into an object detection network, whether the object detection network detects a target object in a previous frame of inputted image; and if yes, proceeding to the step 62; otherwise, proceeding to the step 65.

The step 62 includes: recording a detection position of a detection box of the target object if the object detection network detects the target object in the previous frame of inputted image.

The step 63 includes: determining a position of a crop box in a current to-be-detected image according to the detection position of the detection box of the target object in the previous frame of inputted image, where the detection box is within the crop box.

Optionally, coordinates of a center point of the crop box are the same as coordinates of a center point of the detection box, the length of the crop box is n times the length of the long side of the detection box, and the width of the crop box is m times the length of the long side of the detection box. Both m and n are positive integers. For example, assuming that the long side of the detection box is x, the size of the crop box is 4x×3x.

Further, optionally, an aspect ratio of the to-be-detected image is n:m, for example, 4:3 or 16:9.

The step 64 includes: cropping the current to-be-detected image based on the position of the crop box, to obtain the to-be-detected image to be inputted into the object detection network.

The step 65 includes: inputting a current frame of image into the object detection network as the to-be-detected image if the object detection network fails to detect the target object in the previous frame of inputted image.

In the embodiment of the present disclosure, after the target object is detected in the current frame of captured image, during detection in a next frame, a region near the detection box is obtained through cropping, to be used as an input to the object detection network, so that an area ratio of the target object at a long distance to the entire image can be increased, and the precision of long-distance detection can be effectively improved, thereby improving the robustness of the object detection network during the frame-wise detection.

The object detection network in the embodiment of the present disclosure may be the object detection network having an SSD structure.

In the embodiment of the present disclosure, if the target object is a hand, during interaction, a user may first spread the palm to "activate" the object detection network. After detecting the palm of the user, the object detection network stably performs detection near the region where the palm is detected. After completing the "activate" operation, the user may interact with a computer by using various other gestures. When the user finds that the interaction between the user and the computer is interrupted, the user may "activate" the algorithm again by using the palm operation.

Figure 7:
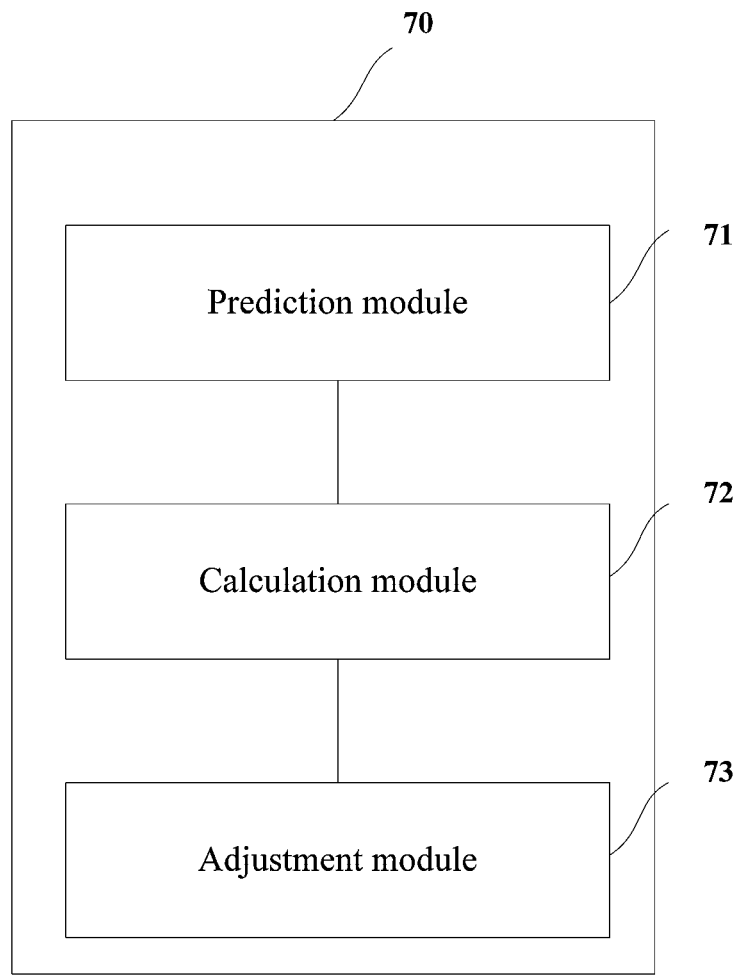
FIG. 7 is a schematic structural diagram of an apparatus of training an object detection network according to an embodiment of the present disclosure.

Referring to FIG. 7, an embodiment of the present disclosure provides an object detection apparatus 70, including:

a prediction module 71, configured to input a training image into a to-be-trained object detection network to obtain detection information of a target object in the training image, where the detection information includes a detection class of the target object, a detection position of a detection box of the target object, and a detection position of a landmark of the target object inside the detection box;

a calculation module 72, configured to calculate a total loss function of the to-be-trained object detection network, where the total loss function is calculated according to a first loss function of the detection class of the target object, a second loss function of the detection position of the detection box of the target object, and a third loss function of the detection position of the landmark of the target object inside the detection box; and an adjustment module 73, configured to adjust a parameter of the to-be-trained object detection network according to the total loss function of the to-be-trained object detection network, to obtain a trained object detection network.

Optionally, the detection position of the detection box includes: an offset amount of the horizontal coordinate of the center point of the detection box relative to the horizontal coordinate of the center point of a candidate box, an offset amount of the vertical coordinate of the center point of the detection box relative to the vertical coordinate of the center point of the candidate box, an offset amount of the length of the detection box relative to the length of the candidate box, and an offset amount of the width of the detection box relative to the width of the candidate box; and the detection position of the landmark of the target object inside the detection box includes a predicted horizontal coordinate of the landmark of the target object and a predicted vertical coordinate of the landmark of the target object.

Optionally, the prediction module is configured to: input the training image into a first convolutional network of the to-be-trained object detection network, to obtain feature maps of a plurality of scales; and individually input the feature maps of the scales into a second convolutional network of the to-be-trained object detection network, to obtain detection information of the detection box at each pixel position in each feature map, where the to-be-trained object detection network includes the first convolutional network and the second convolutional network.

Optionally, the second convolutional network includes a first convolutional layer with a convolution kernel size of 1*1*n, where the first convolutional layer is configured to convert the feature map into a first target feature map including the detection position of the landmark of the target object inside the detection box, and n is any positive integer.

Optionally, the total loss function is calculated by using the following formula:

$$L = L_{cls} + \alpha_1 L_{box} + \alpha_2 L_{ldm},$$

where L is the total loss function, $L_{cls}$ is the first loss function, $L_{box}$ is the second loss function, $L_{ldm}$ is the third loss function, and $\alpha_1$ and $\alpha_2$ are weights.

Optionally, the first loss function is calculated by using the following formula:

$$L_{cls} = -\sum_{i \in Pos}^{N} x_{ij} \log(c_i^p) - \sum_{i \in Neg} \log(c_i^0)$$

where i represents an $i^{th}$ candidate box, j represents a $j^{th}$ true box, p represents a $p^{th}$ class, $x_{ij}$ represents whether the $i^{th}$ candidate box matches the $j^{th}$ true box, $c_i^p$ represents a probability that the $i^{th}$ candidate box is determined as the $p^{th}$ class, $c_i^0$ represents a probability that the $i^{th}$ candidate box is determined as a background class, Pos represents a set of candidate boxes that match the $j^{th}$ true box, and Neg represents the set of candidate boxes that do not match the $j^{th}$ true box.

Optionally, the second loss function is calculated by using the following formula:

$$L_{box} = \sum_{i \in Pos}^{N} x_{ij} smooth_{L1}(l_{bi} - g_{bj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{bi}$ represents a detection position of a detection box corresponding to the $i^{th}$ candidate box, and $g_{bj}$ is the position of the $j^{th}$ true box.

Optionally, the third loss function is calculated by using the following formula:

$$L_{ldm} = \sum_{i \in Pos}^{N} x_{ij} smooth_{L1}(l_{li} - g_{lj})$$

where i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{li}$ represents a detection position of a landmark of a target object inside a detection box corresponding to the $i^{th}$ candidate box, and $g_{lj}$ is a true position of a landmark of a target object in the $j^{th}$ true box.

Optionally, the apparatus of training an object detection network further includes:
  a generation module, configured to randomly generate, for each to-be-enhanced training image, a color mask with a size the same as a size of the to-be-enhanced training image, where the color mask includes only one color; and
  a fusion module, configured to fuse the to-be-enhanced training image and the color mask, to obtain a color-enhanced training image which is used as the training image inputted into the to-be-trained object detection network.

Optionally, the fusion module is configured to fuse the to-be-enhanced training image and the color mask by using the following formula:

$$img_{aug} = \alpha * color_{mask} + (1-\alpha) * img,$$

where $color_{mask}$ represents the generated color mask, img represents the to-be-enhanced training image, $\alpha$ represents a weight, $img_{aug}$ represents the color-enhanced training image, and $0 < \alpha < 0.5$.

Optionally, the apparatus of training an object detection network further includes:
  a first conversion module, configured to convert, for each to-be-enhanced training image, the to-be-enhanced training image from an RGB color space into an HSV color space;
  a transformation module, configured to randomly transform an H channel of the to-be-enhanced training image converted into the HSV color space, to obtain a transformed to-be-enhanced training image; and
  a second conversion module, configured to convert the transformed to-be-enhanced training image back into the RGB color space, to obtain a color-enhanced training image which is used as the training image inputted into the to-be-trained object detection network.

Optionally, the transformation module is configured to perform linear transformation of the H channel of the to-be-enhanced training image converted into the HSV color space.

Optionally, the target object is a hand, and the landmark is a point representing a joint position of the target object.

Figure 8:
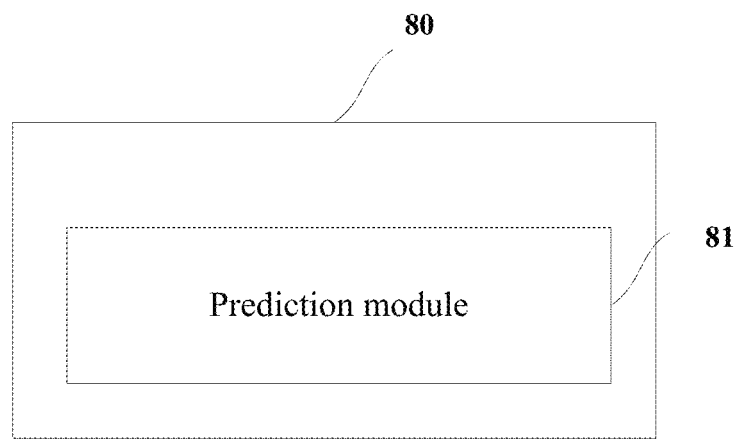
FIG. 8 is a schematic structural diagram of an object detection apparatus according to an embodiment of the present disclosure.

Referring to FIG. 8, an embodiment of the present disclosure provides an object detection apparatus 80, including:
  a prediction module 81, configured to: input a to-be-detected image into an object detection network, and output a detection position and a detection class of a detection box of a target object in the to-be-detected image, where the object detection network is trained by using the method of training an object detection network according to the first aspect.

Optionally, the prediction module is configured to: record the detection position of the detection box of the target object if the object detection network detects the target object in a previous frame of inputted image; determine a position of a crop box in the current to-be-detected image according to the detection position of the detection box of the target object in the previous frame of inputted image, where the detection box is within the crop box; and crop the current to-be-detected image based on the position of the crop box, to obtain the to-be-detected image to be inputted into the object detection network.

Optionally, the coordinates of the center point of the crop box are the same as the coordinates of the center point of the detection box, the length of the crop box is n times the length of the long side of the detection box, and the width of the crop box is m times the length of the long side of the detection box.

Optionally, an aspect ratio of the to-be-detected image is n:m.

Optionally, the prediction module is configured to input the current to-be-detected image into the object detection network as the to-be-detected image if the object detection network fails to detect the target object in the previous frame of inputted image.

Figure 9:
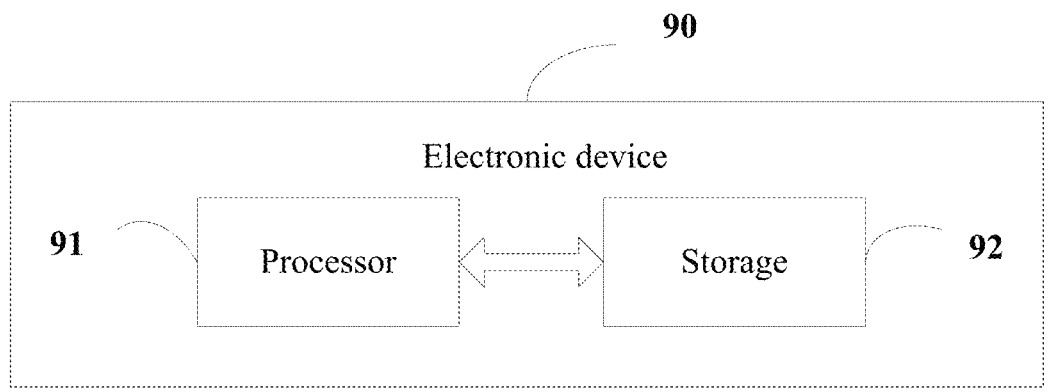
FIG. 9 is a schematic structural diagram of an electronic device according to an embodiment of the present disclosure.

As shown in FIG. 9, an embodiment of the present disclosure further provides an electronic device 90, includes a processor 91, a storage 92, and a program or instruction stored in the storage 92 and configured to be executed by the processor 91. When the program or instruction is executed by the processor 91, various processes in the embodiments of the method of training an object detection network are implemented, and the same technical effects can be achieved, or, when the program or instruction is executed by the processor 91, various processes in the embodiments of the object detection method are implemented, and the same technical effects can be achieved.

An embodiment of the present disclosure further provides a readable storage medium, where the readable storage medium stores a program or instruction therein, and when the program or instruction is executed by a processor, various processes in the embodiments of the method of training an object detection network are implemented, or, when the program or instruction is executed by a processor, various processes in the embodiments of the object detection method are implemented, and the same technical effects can be achieved. To avoid repetition, details are not described herein again. The readable storage medium includes a computer-readable storage medium, for example, a read-only memory (ROM), a random access memory (RAM), a magnetic disk, an optical disc, or the like.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, persons of ordinary skill in the art may further make various forms without departing from the spirit of the present disclosure and scope of the claims, and these forms all fall within the scope of the present disclosure.

What is claimed is:

1. A method of training an object detection network, comprising:
inputting a training image into a to-be-trained object detection network to obtain detection information of a target object in the training image, wherein the detection information comprises a detection class of the target object, a detection position of a detection box of the target object, and a detection position of a landmark of the target object inside the detection box;
calculating a total loss function of the to-be-trained object detection network, wherein the total loss function is calculated according to a first loss function of the detection class of the target object, a second loss function of the detection position of the detection box of the target object, and a third loss function of the detection position of the landmark of the target object inside the detection box; and
adjusting a parameter of the to-be-trained object detection network according to the total loss function of the to-be-trained object detection network, to obtain a trained object detection network.

2. The method according to claim 1, wherein the inputting the training image into the to-be-trained object detection network to obtain the detection information of the target object in the training image comprises:
inputting the training image into a first convolutional network of the to-be-trained object detection network, to obtain feature maps of a plurality of scales; and
individually inputting the feature maps of the scales into a second convolutional network of the to-be-trained object detection network, to obtain detection information at each pixel position in each of the feature maps, wherein the to-be-trained object detection network comprises the first convolutional network and the second convolutional network.

3. The method according to claim 2, wherein the second convolutional network comprises a first convolutional layer with a convolution kernel size of 1*1*n, wherein the first convolutional layer is configured to convert a respective feature map into a first target feature map comprising the detection position of the landmark of the target object inside the detection box, and n is any positive integer.

4. The method according to claim 1, wherein the total loss function is calculated by using the following formula:

$$L = L_{cls} + \alpha_1 L_{box} + \alpha_2 L_{ldm},$$

wherein L is the total loss function, $L_{cls}$ is the first loss function, $L_{box}$ is the second loss function, $L_{ldm}$ is the third loss function, and $\alpha_1$ and $\alpha_2$ are weights.

5. The method according to claim 4, wherein the first loss function is calculated by using the following formula:

$$L_{cls} = -\sum_{i \in Pos}^{N} x_{ij} \log(c_i^p) - \sum_{i \in Neg} \log(c_i^0)$$

wherein i represents an $i^{th}$ candidate box, j represents a $j^{th}$ true box, p represents a $p^{th}$ class, $x_{ij}$ represents whether the $i^{th}$ candidate box matches the $j^{th}$ true box, $c_i^p$ represents a probability that the $i^{th}$ candidate box is determined as the $p^{th}$ class, $c_i^0$ represents a probability that the $i^{th}$ candidate box is determined as a background class, Pos represents a set of candidate boxes that match the $j^{th}$ true box, and Neg represents a set of candidate boxes that do not match the $j^{th}$ true box.

6. The method according to claim 4, wherein the second loss function is calculated by using the following formula:

$$L_{box} = \sum_{i \in Pos}^{N} x_{ij} smooth_{L1}(l_{bi} - g_{bj})$$

wherein i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{bi}$ represents a detection position of a detection box corresponding to the $i^{th}$ candidate box, and $g_{bj}$ is a position of the $j^{th}$ true box.

7. The method according to claim 4, wherein the third loss function is calculated by using the following formula:

$$L_{ldm} = \sum_{i \in Pos}^{N} x_{ij} smooth_{L1}(l_{li} - g_{lj})$$

wherein i represents an $i^{th}$ candidate box, j represents a $j^{th}$ true box, $x_{ij}$ represents whether the $i^{th}$ candidate box matches the $j^{th}$ true box, Pos represents a set of candidate boxes that match the $j^{th}$ true box, $smooth_{L1}$ represents a loss function, $l_{li}$ represents a detection position of a landmark of a target object inside a detection box corresponding to the $i^{th}$ candidate box, and $g_{lj}$ is a true position of a landmark of a target object in the $j^{th}$ true box.

8. The method according to claim 1, wherein
the detection position of the detection box comprises: an offset amount of a horizontal coordinate of a center point of the detection box relative to a horizontal coordinate of a center point of a candidate box, an offset amount of a vertical coordinate of the center point of the detection box relative to a vertical coordinate of the center point of the candidate box, an offset amount of a length of the detection box relative to a length of the candidate box, and an offset amount of a width of the detection box relative to a width of the candidate box; and
the detection position of the landmark of the target object inside the detection box comprises a predicted horizontal coordinate of the landmark of the target object and a predicted vertical coordinate of the landmark of the target object.

9. The method according to claim 1, wherein before the inputting the training image into the to-be-trained object detection network to obtain the detection information of the target object in the training image, the method further comprises:
randomly generating, for each to-be-enhanced training image, a color mask with a size the same as a size of the to-be-enhanced training image, wherein the color mask comprises only one color; and
fusing the to-be-enhanced training image and the color mask, to obtain a color-enhanced training image as the training image inputted into the to-be-trained object detection network.

10. The method according to claim 9, wherein the to-be-enhanced training image and the color mask are fused by using following formula:

$$img_{aug} = \alpha * color_{mask} + (1-\alpha) * img,$$

wherein $color_{mask}$ represents the color mask, img represents the to-be-enhanced training image, α represents a weight, $img_{aug}$ represents the color-enhanced training image, and 0<α<0.5.

11. The method according to claim 1, wherein before the inputting the training image into the to-be-trained object detection network to obtain the detection information of the target object in the training image, the method further comprises:
converting, for each to-be-enhanced training image, the to-be-enhanced training image from an RGB color space into an HSV color space;
randomly transforming an H channel of the to-be-enhanced training image converted into the HSV color space, to obtain a transformed to-be-enhanced training image; and
converting the transformed to-be-enhanced training image back into the RGB color space, to obtain a color-enhanced training image as the training image inputted into the to-be-trained object detection network.

12. The method according to claim 1, wherein the target object is a hand, and the landmark is a point representing a joint position of the target object.

13. An object detection method, comprising:
inputting a to-be-detected image into an object detection network, and outputting a detection position and a detection class of a detection box of a target object in the to-be-detected image,
wherein the object detection network is trained by using the method of training an object detection network according to claim 1.

14. The object detection method according to claim 13, wherein the inputting the to-be-detected image into the object detection network, and outputting the detection position and the detection class of the detection box of the target object in the to-be-detected image comprises:
inputting the to-be-detected image into the object detection network, to obtain detection information of the target object in the to-be-detected image, wherein the detection information comprises the detection class of the target object, the detection position of the detection box of the target object, and a detection position of a landmark of the target object inside the detection box; and
outputting the detection position and the detection class of the detection box of the target object in the to-be-detected image based on the detection position of the landmark of the target object inside the detection box.

15. The object detection method according to claim 13, wherein before the inputting the to-be-detected image into the object detection network, the method further comprises:
obtaining a current to-be-detected image; and
the inputting the to-be-detected image into the object detection network, and outputting the detection position of the detection box of the target object in the to-be-detected image comprises:
recording the detection position of the detection box of the target object in a case that the object detection network detects the target object in a previous frame of inputted image;
determining a position of a crop box in the current to-be-detected image according to the detection position of the detection box of the target object in the previous frame of inputted image, wherein the detection box is within the crop box; and cropping the current to-be-detected image based on the position of the crop box, to obtain the to-be-detected image to be inputted into the object detection network.

16. The object detection method according to claim 15, wherein
coordinates of a center point of the crop box are the same as coordinates of a center point of the detection box, a length of the crop box is n times a length of a long side of the detection box, and a width of the crop box is m times the length of the long side of the detection box.

17. The object detection method according to claim 16, wherein an aspect ratio of the to-be-detected image is n:m.

18. The object detection method according to claim 15, further comprising:
inputting the current to-be-detected image into the object detection network as the to-be-detected image in a case that the object detection network fails to detect the target object in the previous frame of inputted image.

19. An electronic device, comprising:
one or more memory; and
one or more processors;
wherein the one or more memory and the one or more processors are connected with each other; and
the one or more memory stores computer-executable instructions for controlling the one or more processors to:
input a training image into a to-be-trained object detection network to obtain detection information of a target object in the training image, wherein the detection information comprises a detection class of the target object, a detection position of a detection box of the target object, and a detection position of a landmark of the target object inside the detection box;
calculate a total loss function of the to-be-trained object detection network, wherein the total loss function is calculated according to a first loss function of the detection class of the target object, a second loss function of the detection position of the detection box of the target object, and a third loss function of the detection position of the landmark of the target object inside the detection box; and
adjust a parameter of the to-be-trained object detection network according to the total loss function of the to-be-trained object detection network, to obtain a trained object detection network.

20. An electronic device, comprising:
one or more memory; and
one or more processors;
wherein the one or more memory and the one or more processors are connected with each other; and
the one or more memory stores computer-executable instructions for controlling the one or more processors to input a to-be-detected image into an object detection network, and outputting a detection position and a detection class of a detection box of a target object in the to-be-detected image;
wherein the one or more memory further stores computer-executable instructions for controlling the one or more processors to train the object detection network by:
inputting a training image into a to-be-trained object detection network to obtain detection information of a target object in the training image, wherein the detection information comprises a detection class of the target object, a detection position of a detection box of the target object, and a detection position of a landmark of the target object inside the detection box;
calculating a total loss function of the to-be-trained object detection network, wherein the total loss function is calculated according to a first loss function of the detection class of the target object, a second loss function of the detection position of the detection box of the target object, and a third loss function of the detection position of the landmark of the target object inside the detection box; and
adjusting a parameter of the to-be-trained object detection network according to the total loss function of the to-be-trained object detection network, to obtain a trained object detection network.

* * * * *